United States Patent Office 3,140,858
Patented July 14, 1964

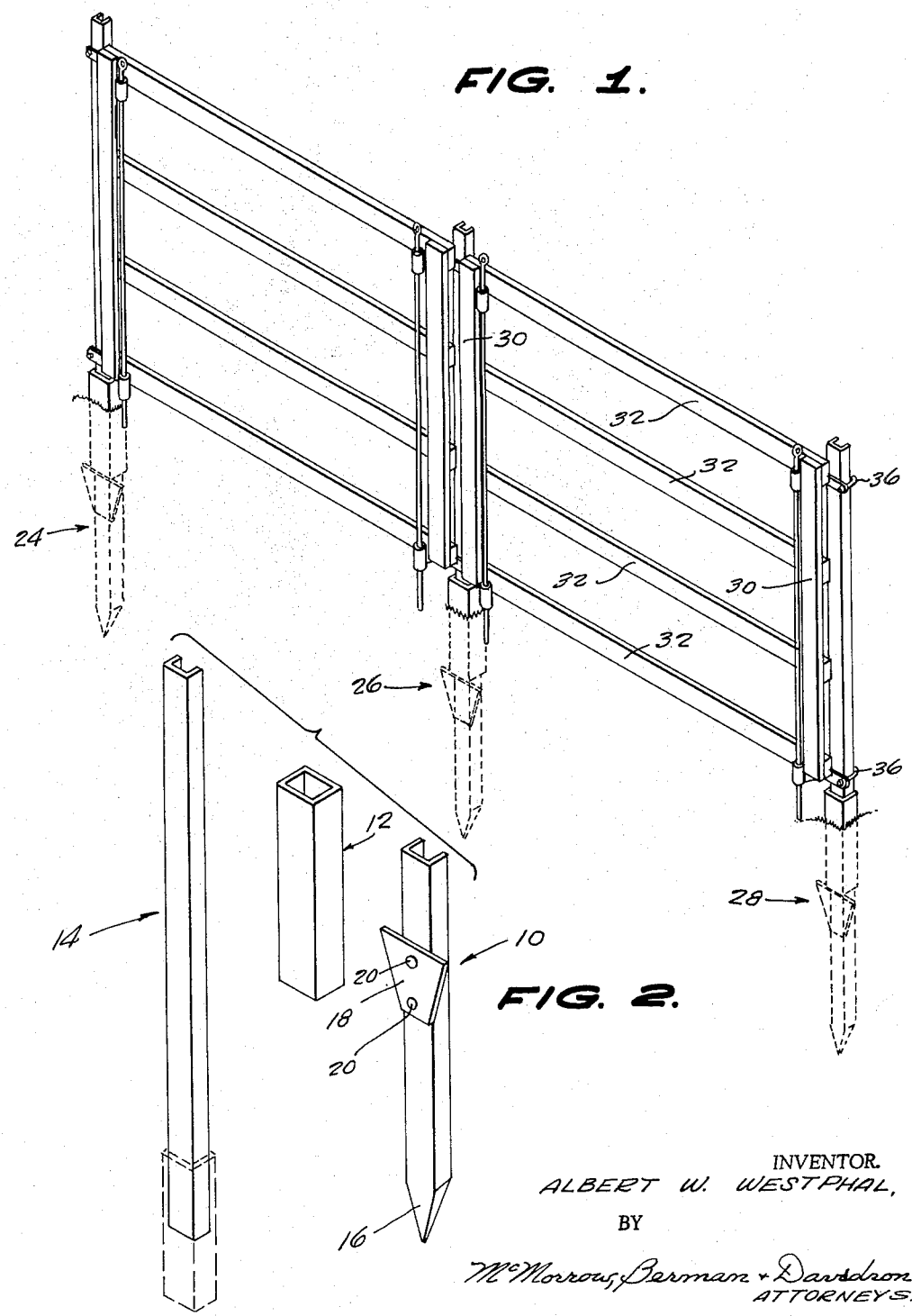

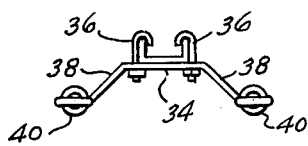
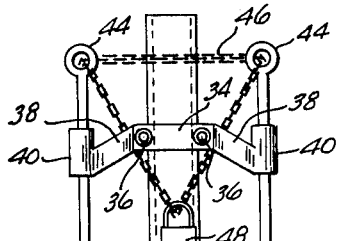
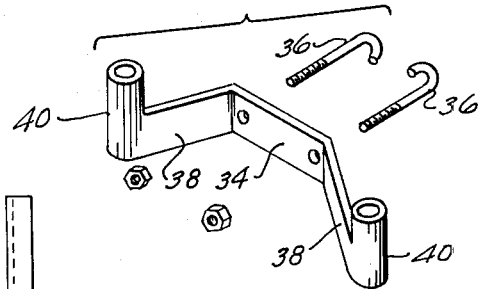
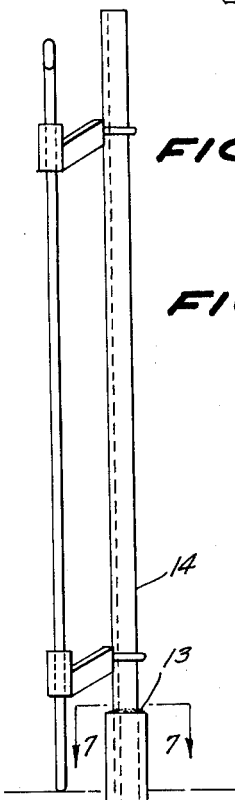
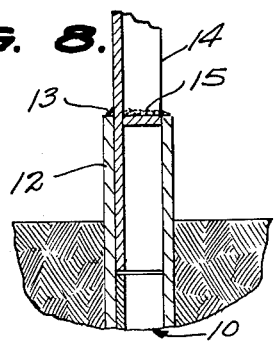
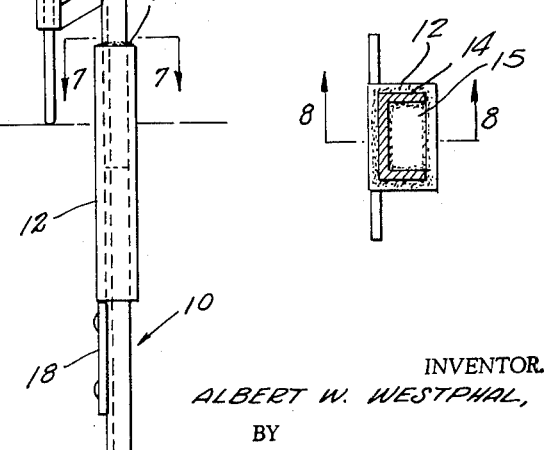

3,140,858
FENCE ASSEMBLY
Albert W. Westphal, R.R. 1, Francesville, Ind.
Filed Aug. 24, 1962, Ser. No. 219,286
8 Claims. (Cl. 256—24)

This invention relates to a fence assembly including ground-anchored standards, and has particular relation to an arrangement having a more-or-less permanent ground-anchoring stake portion, which includes a socket adapted for easy insertion and removal of the above-ground portion of a post, so that, in one manner of use, gateways may be provided by easy removal of fence sections and posts.

It is, therefore, a general object of the invention to provide a readily removable and replaceable fence assembly. A related object is to provide a fence assembly which has a removable standard or post, having attaching means for fence sections providing for ready attachment and removal thereof. More particularly, it is an object to provide a fence assembly having a permanent ground stake with a top portion telescopically receiving an above-ground standard.

Yet another object is to provide a fence assembly as aforesaid, in which the standard carries brackets adapted for simple hanging of a fence section, together with removable keeper means, for normally retaining the fence section in place.

The objects also include the attainment of the foregoing in a device which is simple of construction, yet strong and durable, easy of assembly and disassembly, adapted for compactness in shipping and storage, easy of manufacture and low in cost.

These and other ends, which will be apparent, are attained by the present invention, a preferred form of which is described in the following specification, as illustrated in the drawings, in which:

FIGURE 1 is a perspective view of a pair of removable fence sections, mounted on removable fence posts, constructed according to the invention, FIGURE 2 is a bracketed view, in perspective, showing one of the fence posts separated into its component parts, and to enlarged scale, FIGURE 3 is a top plan view of the central fence post shown in FIGURE 1, FIGURE 4 is a front elevational view of the post shown in FIGURE 3, FIGURE 5 is a side elevational view of the post of FIGURE 4, as seen from the left of FIGURE 4, FIGURE 6 is a bracketed view, in perspective, on enlarged scale, showing one of the fence-supporting brackets, and its fasteners, FIGURE 7 is a transverse, sectional view through one of the posts, taken on the line 7—7 of FIGURE 5, on enlarged scale, and FIGURE 8 is a sectional view taken on the line 8—8 of FIGURE 7.

By referring to the drawings by characters of reference, there is shown, in FIGURE 2, the three main parts of the post assembly, comprising an anchoring ground stake 10, a coupling sleeve 12 and a fence post 14, the stake and post being formed from channel section, and the coupling sleeve from rectangular tubing. In the assembly of these parts, it is possible to employ them as three separate pieces, or to secure the sleeve to the stake or to the post. In either case, the stake is intended for permanent ground anchorage, and the post for removal and replacement at will. For purposes of illustration, the assembly will be shown with the sleeve secured to the post, which will be clear by reference to FIGURES 7 and 8, wherein sleeve 12 is secured to post 14 by a line of weld 13, so that the sleeve dwells on plate 18, and the post dwells on stake 10. A plate 15 welded to the post keeps foreign matter out.

The stake 10 has a pointed, lower end 16, formed by suitably cutting, bending and welding the three sides of the channel, and is provided, on one face, with a downwardly-tapering plate 18, secured as by rivets 20, which provides increased resistance against withdrawal and twisting of the stake when driven into the ground. The top edge of this plate also serves as a stop, to limit downward movement of sleeve 12 on stake 10. As seen in FIGURES 1 and 4, the sleeve 12 is substantially underground in the working position of the parts, and, therefore, if attached to the stake, will preferably be mounted on the stake before the top of the plate 18 has passed below the ground surface during driving, the final drive being imparted to the top of sleeve 12. With the stake and sleeve thus in place, it only remains to slide post 14 down into the sleeve until its lower edge dwells on the top edge of the stake.

The three posts 24, 26, 28, shown in the gateway system of FIGURE 1, are all identical with the structure just described, but this structure has functional significance mainly in respect to the center post, and the two end posts could be of conventional structure, and permanently installed in the case where the temporary removal of not more than two fence sections is contemplated. On the other hand, greater flexibility may be required in response to varying needs as to where a gateway is to be required from time-to-time, and from this standpoint it may be desirable to provide removable posts throughout the entire perimeter of a tract, or a substantial portion thereof.

By way of illustrating one mode of practice of the invention, FIGURE 1 shows the use of a pair of identical fence sections, with two vertical end rails 30, and four, spaced, parallel, horizontal rails 32, the section being slightly less in height than the fence posts, and with its ends overlapping the faces of adjacent fence posts. Thus, two ends 30 overlap the upright of center post 26 in FIGURE 1.

The fence sections are supported on a system of hanger brackets, the structure of which is best observed in FIGURES 3–6. Thus, each of the brackets, formed from steel strap, comprises a flat, central portion, or bight 34, secured to channel post 14 by J-bolts 36, downwardly and outwardly-slanting, as well as outwardly-diverging arms 38, and rolled, outer ends 40, of increased width, adapted to slidably receive keeper rods 42. By the clamping arrangement, the brackets may be located at various places along the post, and thus accommodate a variety of forms of gate sections, and in the case shown, one is located near the top of the post and the other near the bottom, in such manner that the top rails 32 are suspended on the upper brackets, while the bottom rails 32 are suspended on the lower brackets. If only two gate sections are required, the brackets on the permanent end posts 24 and 28, need only have one arm 38, as shown in FIGURE 1.

With the gate sections suspended in place on the brackets, the system is locked by dropping rods 42 through the aligned, rolled ends 40 of the upper and lower brackets, and may be supported on the ground surface when so mounted. The sections may also be hung on the wide, rolled ends 40, without the use of rods. For ease of handling, the keeper rods 42 are provided with closed loops, or eyes, 44, and these loops are further useful in receiving a locking chain 46, passed through two neighboring loops, and around the bracket, and secured by a padlock 48.

In ordinary use, the gate sections serve as a fence, but when an opening is required, as for the passage of bulky farm machinery or vehicles, or the passage of stock in or out, it is only necessary to remove the keeper rods, lift the fence or gate sections off the brackets, and lay them out of the way temporarily, with a total time consumption of not more than a few seconds. If the whole width of the two sections is needed for any reason, the center post 26 will also be lifted out, this being also accomplished easily and speedily. When the need for the opening ceases, the parts are easily and quickly replaced.

Among other advantages, this system avoids well-known objectionable features of hinged gates, such as progressive sag, binding, and undue loads on side posts, as well as chronic difficulty with latching.

The system also lends itself to another beneficial mode of use, in which the gate sections may be lifted off, and re-hung at a slightly higher level, so that small stock may pass through, but larger animals are debarred.

It will be understood also, that the novel, removable post of the fence assembly has applications in uses other than that of supporting fence sections, such as, for instance, the supporting of highway signs or markers, and traffic signs in general.

In another contemplated use, the hanging brackets may also be included on the post in two perpendicular directions, in which case, a series of rectangular pens may be build up, for use at fairs and rodeos, for instance, in addition to general agricultural work, where one or more pens are needed.

Generally speaking, while a preferred embodiment has been shown and described, various modifications will be apparent, in the light of this disclosure, and the invention should not, therefore, be deemed as limited, except insofar as shall appear from the spirit and scope of the appended claims.

What is claimed is:

1. A fence assembly, adapted for knock-down, to provide a gateway, comprising a set of at least two, ground-anchored posts, a plurality of hanger brackets on each of said posts, and a unitary section of fence suspended on said brackets, at least one of said posts comprising a ground-anchoring stake, a tubular socket telescopically receivable on the top of the stake, and an upright with its lower end secured in said socket, said stake being of channel cross-section and having a pointed end, a plate secured to one face of said stake and having diverging sides extending beyond said face, said socket being square in cross-section, sized for a snug sliding fit on said stake, and adapted to dwell on the top edge of said plate, said upright being of channel-form cross-section and telescopically received in said socket, said brackets being secured to each of said uprights, and in spaced relation longitudinally thereof, and each comprising at least one arm extending sidewise of the upright and away from the face thereof constituting the channel bottom, and having a coiled loop at its outer end, said loops being aligned on a vertical axis, said fence section having a plurality of spaced, horizontal rails, suspended on said bracket arms, and a plurality of keeper rods, each slidably receivable in the axially-aligned loops of said brackets.

2. An assembly as in claim 1, each of the brackets on one of said posts having two of said arms, extending on opposite sides of the said upright, and said fence sections being at least two in number, with adjacent ends of the sections supported, respectively, on the arms on opposite sides of said upright.

3. A device as in claim 2, said posts being at least three in number, and the outermost posts having brackets with arms supporting the remote ends of said sections, and keeper rods engaging said latter arms.

4. A fence assembly, adapted for knock-down, to provide a gateway, comprising a set of at least two, ground-anchored posts, a plurality of hanger brackets on each of said posts, and a unitary section of fence suspended on said brackets, at least one of said posts comprising a ground-anchoring stake, a tubular socket telescopically receivable on the top of the stake, and an upright with its lower end secured in said socket, a plate secured to said stake and having diverging sides extending on both sides of said stake, said socket being square in cross-section, sized for a snug sliding fit on said stake, and adapted to dwell on the top edge of said plate, said upright being of channel-form cross-section and telescopically received in said socket, said brackets being secured to each of said uprights, and in spaced relation longitudinally thereof, and each comprising at least one arm extending sidewise of the upright and away from the face thereof constituting the channel bottom, and having a coiled loop at its outer end, said loops being aligned on a vertical axis, said fence section having a plurality of spaced, horizontal rails, suspended on said bracket arms, and a plurality of keeper rods, each slidably receivable in the axially-aligned loops of said brackets.

5. A fence assembly, adapted for knock-down, to provide a gateway, comprising a set of at least two, ground-anchored posts, a plurality of hanger brackets on each of said posts, and a unitary section of fence suspended on said brackets, at least one of said posts comprising a ground-anchoring stake, a tubular socket telescopically receivable on the top of the stake, and an upright with its lower end secured in said socket, a plate secured to said stake and having diverging sides extending on both sides of said stake, said socket being square in cross-section, said upright being of channel-form cross-section telescopically received in said socket, said brackets being secured to each of said uprights, and in spaced relation longitudinally thereof, and each comprising at least one arm extending sidewise of the upright and away from the face thereof constituting the channel bottom, and having a coiled loop at its outer end, said loops being aligned on a vertical axis, said fence section having a plurality of spaced, horizontal rails, suspended on said bracket arms, and a plurality of keeper rods, each slidably receivable in the axially-aligned loops of said brackets.

6. A fence assembly, adapted for knock-down, to provide a gateway, comprising a set of at least two, ground-anchored posts, a plurality of hanger brackets on each of said posts, and a unitary section of fence suspended on said brackets, at least one of said posts comprising a ground-anchoring stake, a tubular socket telescopically receivable on the top of the stake, and an upright with its lower end secured in said socket, a plate secured to said stake and having diverging sides extending on both sides of said stake, said socket being square in cross-section, said upright being of channel-form cross-section telescopically received in said socket, said brackets being secured to each of said uprights, and in spaced relation longitudinally thereof, and each comprising at least one arm extending laterally of the upright and having an upstanding coiled loop at its outer end, said loops being aligned on a vertical axis, said fence section having a plurality of spaced, horizontal rails, suspended on said bracket arms, and a plurality of keeper rods, each slidably receivably in the axially-aligned loops of said brackets.

7. A fence assembly, adapted for knock-down, to provide a gateway, comprising a set of at least two, ground-anchored posts, a plurality of hanger brackets on each of said posts, and a unitary section of fence suspended on said brackets, at least one of said posts comprising a ground-anchoring stake, a tubular socket telescopically receivable on the top of the stake, and an upright with its lower end secured in said socket, a plate secured to said stake and having diverging sides extending on both sides of said stake, said socket being square in cross-section, said upright being of channel-form cross-section telescopically received in said socket, said brackets being secured to each of said uprights, and in spaced relation longitudinally thereof, and each comprising at least one arm extending laterally of the upright, and having a coiled loop at its outer end, said loops being aligned on a vertical axis, said fence section adapted to be suspended on said bracket arms, and a plurality of keeper rods, each slidably receivable in the axially-aligned loops of said brackets.

8. A fence assembly, adapted for knock-down, to provide a gateway, comprising a set of at least two, ground-anchored posts, a plurality of hanger brackets on each of said posts, and a unitary section of fence suspended on said brackets, at least one of said posts comprising a ground-anchoring stake, a tubular socket telescopically receivable on the top of the stake, and an upright with its lower end secured in said socket, a plate secured to said stake and having diverging sides extending on both sides of said stake, said upright being telescopically received in said socket, said brackets being secured to each of said uprights, and in spaced relation longitudinally thereof, and each comprising at least one arm extending laterally of the upright with an upstanding, outer end, said fence section adapted to be suspended on said bracket arms, and means embodying keeper rods slidably supported in the outer ends of said bracket arms to retain said sections on said arms.

References Cited in the file of this patent

UNITED STATES PATENTS

| | | |
|---|---|---|
| 173,403 | Hafele | Feb. 15, 1876 |
| 529,067 | Fraser | Nov. 13, 1894 |
| 2,123,329 | Combs et al. | July 12, 1938 |
| 2,987,299 | Kneen | June 6, 1961 |

FOREIGN PATENTS

| | | |
|---|---|---|
| 110,363 | Sweden | Apr. 18, 1944 |